US008683497B2

(12) United States Patent
Lee et al.

(10) Patent No.: US 8,683,497 B2
(45) Date of Patent: Mar. 25, 2014

(54) NETWORK DEVICE DRIVER SYSTEM HAVING COMMUNICATION FUNCTION AND METHOD OF OPERATING THE SYSTEM

(75) Inventors: Jin Wook Lee, Yongin-si (KR); Hun Lim, Yongin-si (KR); Won Keun Kong, Suwon-si (KR); Gene Moo Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1314 days.

(21) Appl. No.: 12/026,579

(22) Filed: Feb. 6, 2008

(65) Prior Publication Data

US 2009/0083767 A1    Mar. 26, 2009

(51) Int. Cl.
*G06F 3/00* (2006.01)
(52) U.S. Cl.
USPC .............................. 719/321; 719/313; 719/318
(58) Field of Classification Search
None
See application file for complete search history.

(56) References Cited

U.S. PATENT DOCUMENTS

| | | | |
|---|---|---|---|
| 6,539,476 B1 * | 3/2003 | Marianetti et al. ............ | 713/100 |
| 7,103,888 B1 * | 9/2006 | Cayton et al. ................. | 719/313 |
| 2002/0143960 A1 * | 10/2002 | Goren et al. .................. | 709/229 |
| 2004/0236991 A1 * | 11/2004 | Brundridge et al. ............ | 714/25 |
| 2005/0281190 A1 * | 12/2005 | McGee et al. ................. | 370/216 |
| 2006/0031395 A1 * | 2/2006 | Kumagawa et al. .......... | 709/217 |
| 2006/0056446 A1 * | 3/2006 | Lee et al. ...................... | 370/465 |
| 2006/0070066 A1 * | 3/2006 | Grobman ......................... | 718/1 |
| 2006/0104308 A1 * | 5/2006 | Pinkerton et al. ............. | 370/469 |
| 2007/0100936 A1 * | 5/2007 | Lum ............................. | 709/203 |

OTHER PUBLICATIONS

"Platform Guide: IP Application Switch", f5. network, 2004, pp. 1-54.*
"Exploiting Task-level Concurrency in a Programmable Network Interface", Kim, 2003, pp. 1-12.*
"Toward Effective NIC Caching: A Hierarchical Data Cache Architecture for iSCSI Storage Servers", Yao, 2005, pp. 1-8.*

* cited by examiner

*Primary Examiner* — Tuan Dao
(74) *Attorney, Agent, or Firm* — NSIP Law (57) ABSTRACT

A network device driver includes a fetching/hooking module to fetch/hook hardware data and/or a hardware event of the communication terminal; a packet assembly module to packetize the hardware data and/or the hardware event; a packet release module to recover the packetized hardware data and/or the hardware event, which are/is received from another terminal connected with the communication terminal via a wired/wireless communication network; and a transmission module to receive/transmit the packetized hardware data and/or the hardware event from/to another communication terminal.

11 Claims, 9 Drawing Sheets

[OUTPUT MODE OPERATION]

NETWORK DEVICE DRIVER SYSTEM HAVING COMMUNICATION FUNCTION AND METHOD OF OPERATING THE SYSTEM

CROSS-REFERENCE TO RELATED APPLICATION

This application claims benefit under 35 U.S.C. §119(a) of a Korean Patent Application No. 10-2007-0095967, filed on Sep. 20, 2007, in the Korean Intellectual Property Office, the entire disclosure of which is incorporated herein by reference.

TECHNICAL FIELD

The following description relates to a network device driver system and method of operating the system.

BACKGROUND

With rapid advance of information technology, various electronic devices are provided in the market, and such electronic devices are situated in our lives as a necessity while changing our life pattern, accordingly most people have at least one electronic device.

Many electronic devices are not generally utilized by themselves, but are utilized with peripheral devices by installing the peripheral devices. In this instance, an electronic device needing to install a peripheral device is required to install a proper device driver for the peripheral device. The device driver may be a type of a program in charge of an interface between hardware and an operating system or an application program of the electronic device, is referred to as a driver in short, and is a program to appropriately operate the peripheral device in a corresponding operating system.

In general, the driver may be divided into two types, as follows: a type in which an operating system automatically performs identification of the peripheral device and installs the driver once an installation program is provided and executed, and the other type in which a driver for a device is manually installed using an additional installation diskette or a CD-ROM.

In the case of most current peripheral devices, since a main device cannot identify a peripheral device until an additional device driver is installed in the main device, there is a problem in that, the device driver is required to be installed in each of a plurality of main devices when the plurality of main devices need to utilize a single peripheral device.

Specifically, it is assumed that there are main devices A and B, and a peripheral device C. When the main device B needs to utilize the peripheral device C after a device driver of the peripheral device C is installed in the main device A, the main device B is still required to be installed with the device driver of the peripheral device C.

However, considering that electronic devices supporting a communication function are broadly utilized in our ordinary lives, along with users' desires for a connecting service between the electronic devices being increased due to advancements of wired/wireless communication technology, it is not efficient to install an additional device driver for a corresponding device to provide compatibility with other devices. Accordingly, there is a need for a new method which can easily provide compatibility between various main devices and various peripheral devices.

SUMMARY

In one general aspect, there is provided a network device driver system which executes a function of corresponding hardware in a user terminal by selecting a portion of hardware installed in another device without installing an additional device driver.

In another general aspect, there is provided a network device driver system which utilizes a function of a peripheral device via communication where a required function of a user is not installed in a user terminal and where the required function is in the peripheral device which is capable of communicating with the user terminal.

In still another general aspect, there is provided a device driver system which expands a function of a user terminal using a peripheral device, via communication, in various circumstances where the user terminal and the peripheral device exist.

In yet another general aspect, a network device driver includes a fetching/hooking module fetching/hooking hardware data and/or a hardware event of the communication terminal; a packet assembly module packetizing the hardware data and/or the hardware event; a packet release module recovering the packetized hardware data and/or the hardware event, which are/is received from another terminal connected with the communication terminal via a wired/wireless communication network; and a transmission module receiving/transmitting the packetized hardware data and/or the hardware event from/to another communication terminal.

In still yet another general aspect, a method of operating a network device driver installed in a communication terminal includes fetching/hooking hardware data and/or a hardware event of the communication terminal; packetizing the hardware data and/or the hardware event; and transmitting the packetized hardware data and/or the hardware event to another terminal connected with the communication terminal via a wired/wireless communication network.

BRIEF DESCRIPTION OF THE DRAWINGS

The above and other aspects and/or features will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
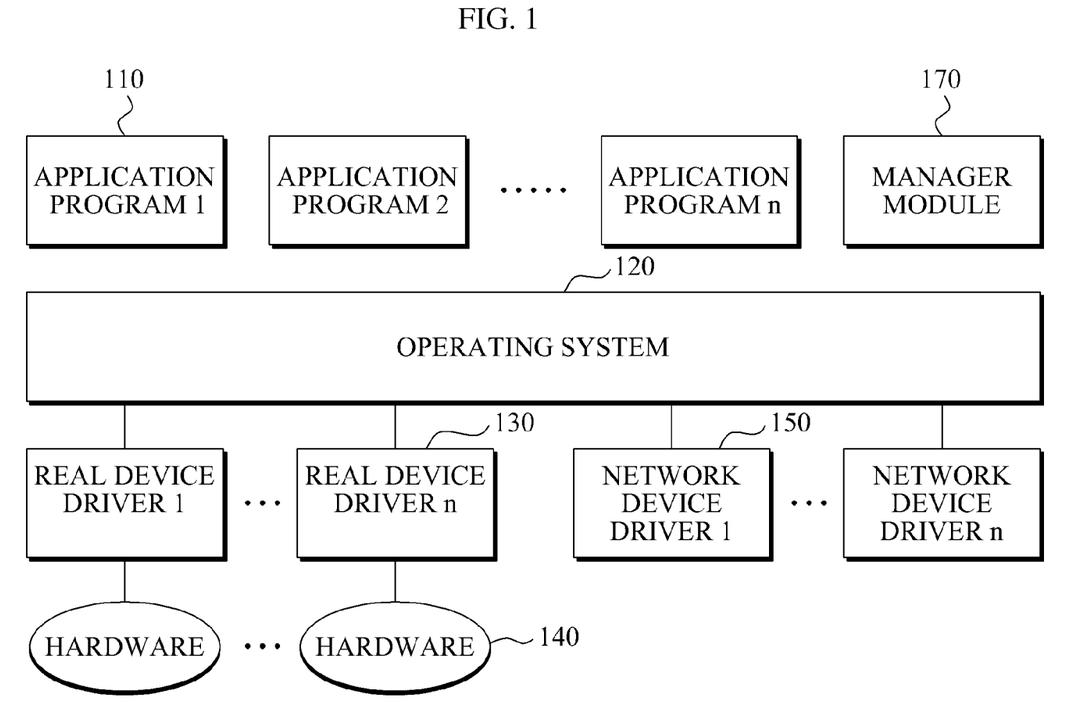
FIG. 1 is a configuration diagram illustrating an exemplary terminal having a network device installed therein.

FIG. 1 illustrates an exemplary terminal having a network device installed therein, and a device driver which is installed where a peripheral device is installed in a main device. In the main device, an operating system 120, an application program 110, a manager module 170, a real device driver 130, and a network device driver 150 are installed, hardware 140 corresponding to the peripheral device is connected with the main device via a wired/wireless method.

The real device driver 130 performs as an interface between the operating system 120, the application program 110, and the hardware 140 in order to operate the hardware 140 under the operating system 120. In this instance, the real device driver 130 indicates an existing device driver, and is referred to as a 'real device driver' to be distinguishable from the network device driver according to an embodiment of the present invention.

In addition to the real device driver 130 interfacing between the hardware 140 and the operating system 120 which are connected with the terminal via a wired/wireless method, the terminal includes at least one network device 150 so that hardware installed in another terminal can be utilized in the terminal. The network device driver 150 may be installed with the real device driver 130, or may be independently installed.

Also, the terminal includes a manager module 170 controlling the network device driver 150 via the operating system 120, and detailed configuration and operation of the network device driver 150 and the manger module 170 will be described by referring to FIGS. 2 and 3.

Figure 2:
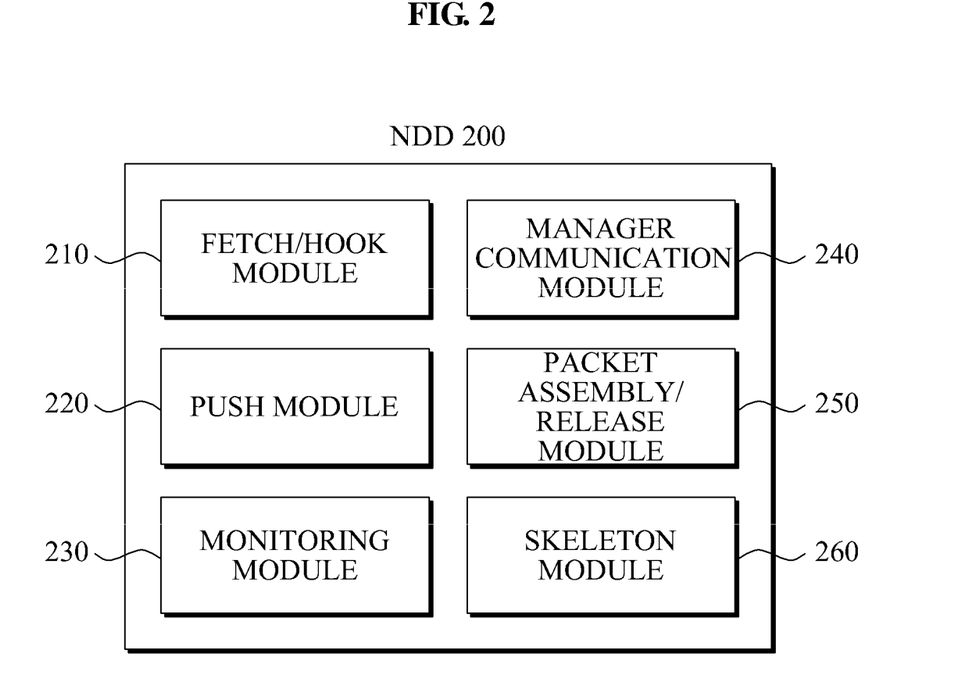
FIG. 2 is a configuration diagram illustrating an exemplary network device driver.

FIG. 2 illustrates an exemplary network device driver 200.

The network device driver (NDD) 200 may transmit/receive instructions of an operating system and a hardware event/hardware data via a network, includes a fetch/hook module 210, a push module 220, a monitoring module 230, a manager communication module 240, a packet assembly/release module 250, and a skeleton module 260, and the above mentioned component elements operate as follows. The fetch/hook module 210 operates differently depending on types of information occurring in hardware. The information being generated in hardware may be divided into continuous information that continuously occurs and information that is generated due to an interrupt. As examples of the continuous information, there is information such as a display signal or a mouse signal. Where the continuous information occurs is generated, a network device driver connects to corresponding hardware, fetches information, and transmits the information to an operating system. As an illustrative purpose, the continuous information may be referred to as hardware data. As an example of the information that is generated due to an interrupt, there is information such as a keyboard input signal. A network device driver may operate only where a corresponding hardware operates, and the information may be referred to as hook. The information that is generated due to an interrupt may be referred to as a hardware event.

The push module 220 receives hardware data or a hardware event occurring in another terminal via a network, and transmits the received hardware data or hardware event to the operating system.

The packet assembly/release module 250 packetizes the hardware data or hardware event having been acquired from the fetch/hook module 210, or releases analyzed packet into original hardware data or an original hardware event by analyzing a packet including the hardware data or hardware event occurring in the other terminal, and transmits the released hardware data or original hardware event to the push module 220.

The manager communication module 240 receive/transmit instructions with a manager module of the terminal by communicating with the manager module, and the monitoring module 230 monitors an operating state of the network device driver 200.

The skeleton module 260 enables the operating system to identify the network device driver 200 as in a real device driver. The network device driver 200 controls corresponding hardware to output a predetermined value, and provides an interface so that the operating system can control the network device driver 200. In this instance, the skeleton module 260 depicts that the predetermined interface is provided.

Hereinafter, an exemplary process of operations between component elements of the network device driver 200 will be described. The process of operations of the network device driver may be divided into two processes as follows: in the case that a network device driver of a terminal (this is referred to as a "master terminal"), the terminal being required to be directly controlled by a user even where a real device of hardware (to utilize-delete?) is not installed, operates to communicate with another terminal (this is referred to as a "slave terminal") having a real device driver of the hardware installed; and in the case that a network device driver of a slave terminal operates to communicate with a master terminal without having a real device driver of the hardware installed. In this instance, the master terminal operates with respect to an input mode, and the slave terminal operates with respect to an output mode.

In the first case that a network device driver of a master terminal operates to communicate with a slave terminal will be described in detail below.

Where the network device driver of the master terminal identifies a real device driver of hardware that needs to be utilized in the master terminal is not installed, the master terminal transmits a request message to the slave terminal for connection to a network. Where the slave terminal transmits a response message in response to the request message to the master terminal, the master terminal is connected with the slave terminal. In this instance, where the network device driver receives a hardware data packet or a hardware event packet that is generated in another device via a network, the packet assembly/release module 250 releases the hardware data packet or hardware event packet by classifying the received hardware data packet or hardware event packet into original hardware data or an original hardware event. The released hardware data or hardware event is transmitted to an operating system via the push module 220, and enables a real device driver of hardware being interoperational with the master terminal to be utilized without installation of the real device driver in the master terminal. In this instance, the skeleton module 260 configures a structure of the network device driver so that the operating system can identify the network device driver as a real device driver.

In the second case that a network device driver of a slave terminal operates to communicate with a master terminal will be described in detail below.

Where the slave terminal receives a request message for a connection to a network from a master terminal without having a real device driver of hardware being installed, a slave terminal transmits a response message in response to the request message to the master terminal so that the master terminal and the slave terminal may be connected with each other.

Where hardware information is generated after the slave terminal is connected to the master terminal, the network device driver verifies whether the hardware information is hardware data or a hardware event, and fetches/hooks the hardware data or hardware event via the fetch/hook module 210. The hardware data or hardware event, which is acquired in the fetch/hook module 210, is transmitted to the packet assembly/release module 250, and the packet assembly/release module 250 packetizes the acquired hardware data or hardware event. The packetized hardware data or hardware event is transmitted to the master terminal via the network so that the hardware may be utilized in the master terminal having a real device driver of the hardware not installed.

Figure 3:
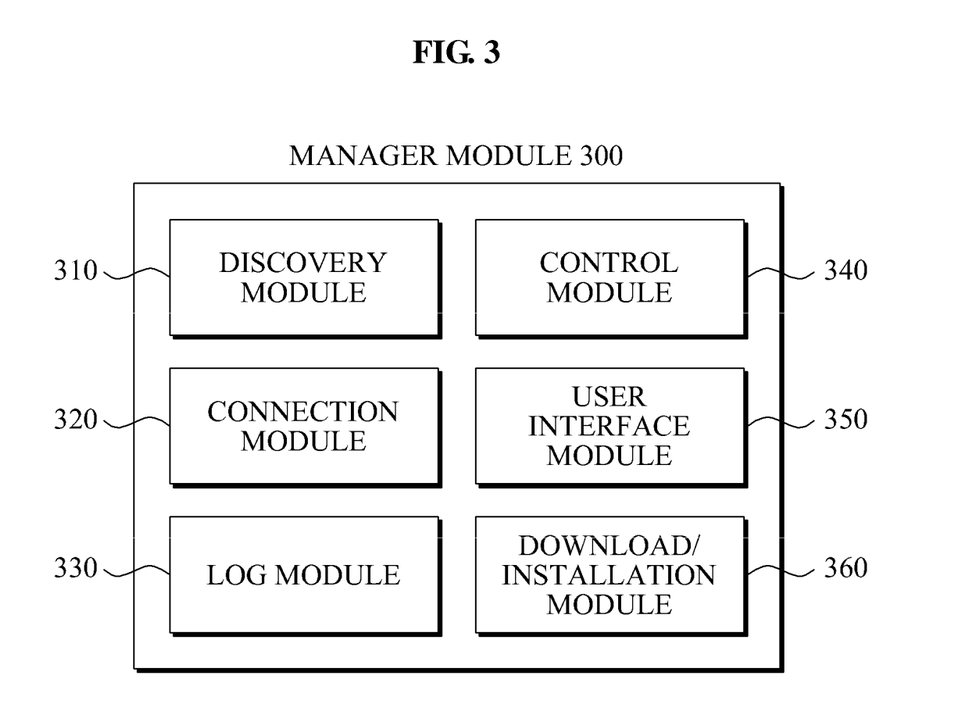
FIG. 3 is a configuration diagram illustrating an exemplary manager module.

FIG. 3 illustrates an exemplary manager module 300.

The manager module 300 controls operations of a network device driver, and performs as an interface for interaction with a user. The manager module 300 includes a discovery module 310, a connection module 320, a log module 330, a control module 340, a user interface module 350, and a download/installation module 360. The discovery module 310 discovers whether a network device driver exists in an operating system, the connection module 320 connects to another manager module in order to communicate with the other manager module of another terminal, and the log module 330 records a log record such as a connection record of the network device driver. The control module 340 generally controls each component element in the manager module 300, the user interface module 350 provides an interface for interaction between the manager module 300 and the user, and the download/installation module 360 downloads to install a network device driver which is required for a terminal having a manager module installed, but without the manager module being installed.

Figure 4:
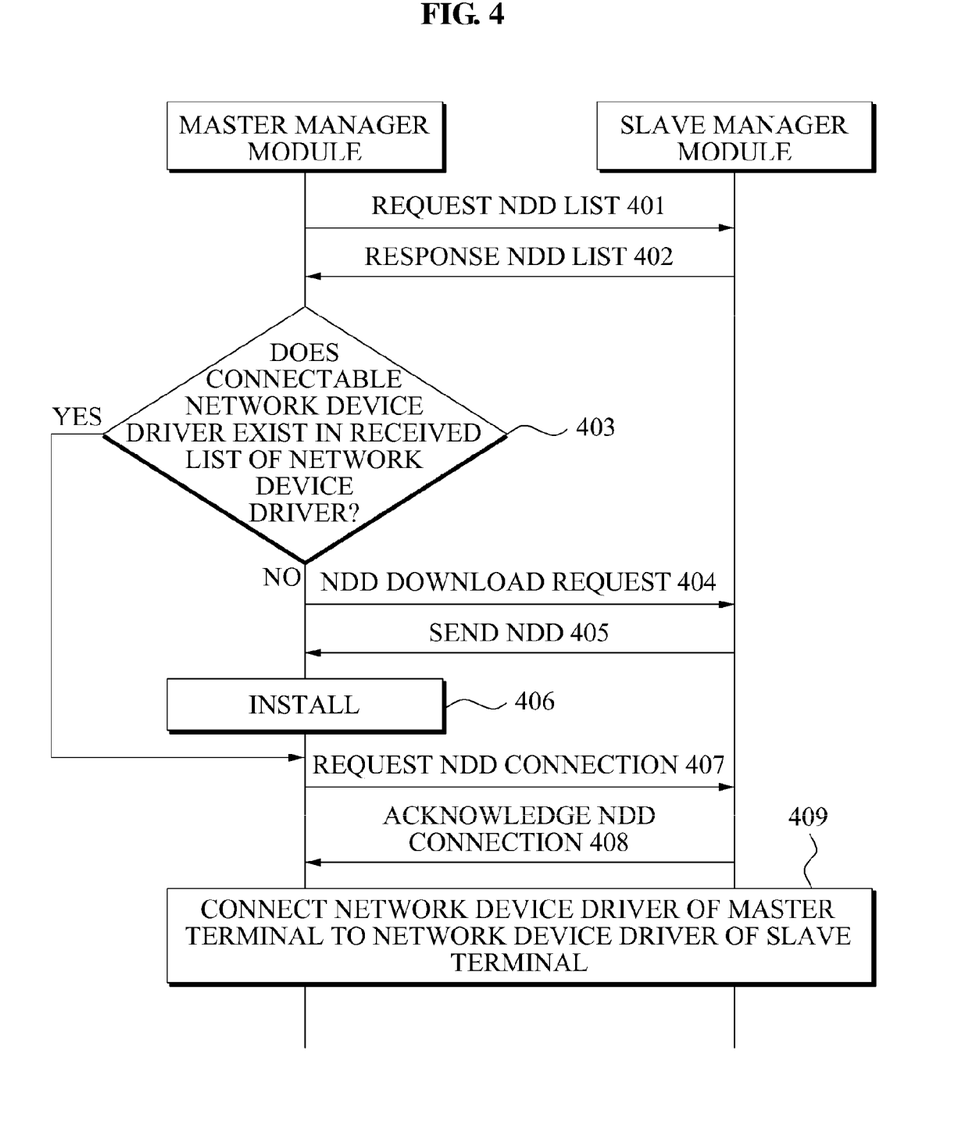
FIG. 4 is a flowchart illustrating an exemplary process of communication between a master manager and a slave manager.

Hereinafter, exemplary operations of the manager module 300 will be described by referring to FIG. 4. A master manager module shown in FIG. 4 indicates a manager module installed in a master terminal which is directly controlled by a user, and a slave manager module shown in FIG. 4 indicates a manager module installed in a slave terminal of another terminal.

The master manager module communicates with the slave manager module, thereby downloading a required network device driver from the slave terminal. In this instance, it is assumed that the required network device driver which is required in the master terminal is installed in the slave terminal. Hereinafter, exemplary operations of the master manager module and the slave manager module will be described.

Where a discovery module of the master manager module identifies a required network device driver does not exist in the master terminal, the connection module connects the master manager module with the slave manager module. Where the master manager module is connected to the slave manager module, the master manager module transmits a request message to the slave manager module requesting a list of the network device drivers in operation 401, and receives the list of the network device drivers from the slave manager module in response to the request message in operation 402. The master manager module verifies whether a connectable network device driver exists in the received list of the network device driver in operation 403.

In this instance, where the connectable network device driver does not exist in the received list of the network device driver, the master manager module requests to download a network device driver which is connectable to the slave manager module in operation 404, downloads a corresponding network device driver in operation 405, and controls the corresponding network device driver to be installed in the master terminal in operation 406. In this instance, the process for the downloading of the corresponding network device driver is performed by a download/installation module in the master manager module. After the installation of the corresponding network device driver in the master terminal is completed, a request message is transmitted to the slave manager module requesting a connection to a network device driver in operation 407. Where a response message with respect to the connection request is received from the slave manager module in response to the request message in operation 408, the master manager module and the slave manager module connect the network device driver of the master terminal to the network device driver of the slave terminal in operation 409.

As a result of the verification of whether the connectable network device driver exists in the list of the network device driver which is received in the master manager module, if the connectable network device driver exists in the master terminal, the process of the downloading of the network device driver may be omitted.

Figure 5:
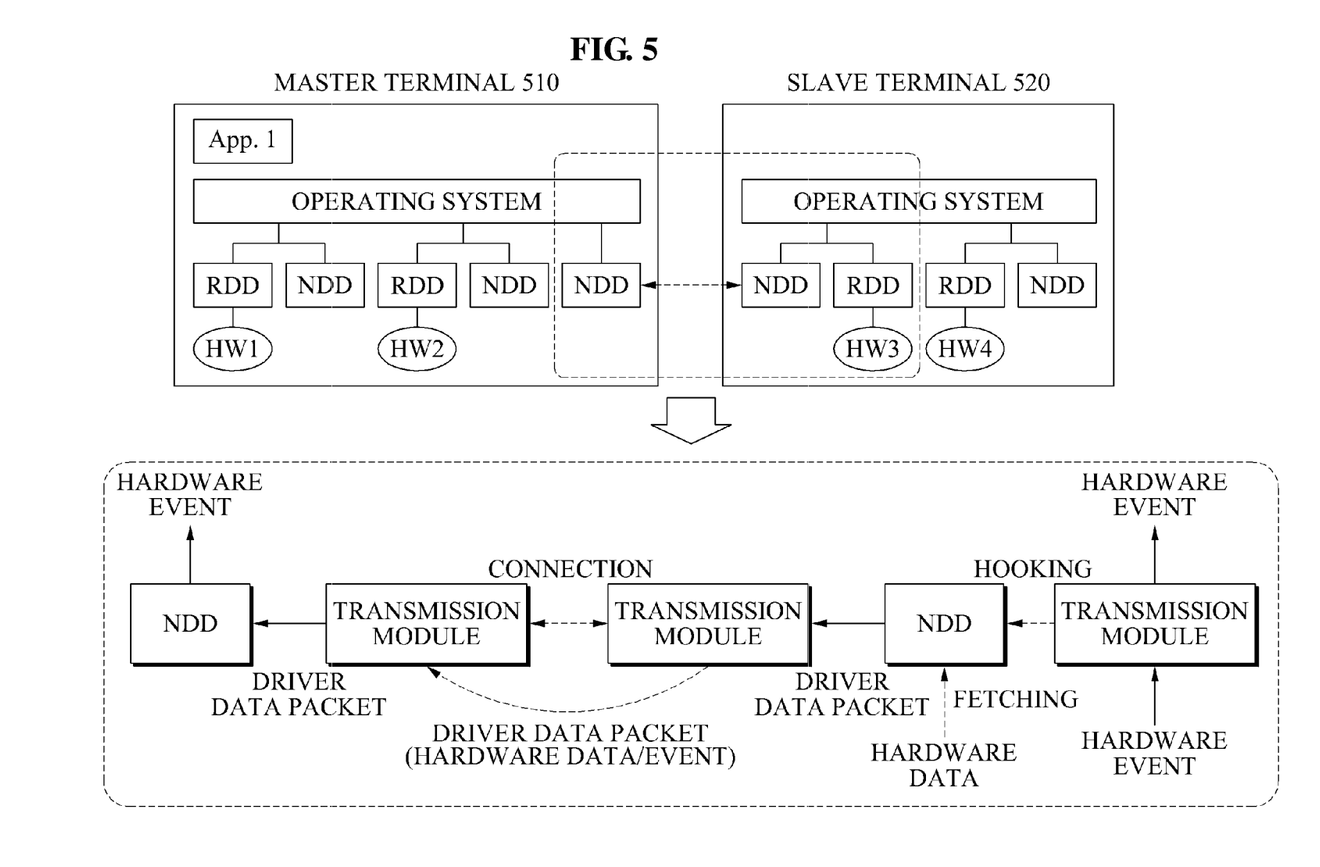
FIG. 5 illustrates an exemplary process of communication between a master terminal and a slave terminal.

FIG. 5 illustrates an exemplary process of communication between network device drivers. A transmission module enabling a network device driver of a master terminal 510 to communicate with a network device driver of a slave terminal 520 is illustrated separately from a network device driver in FIG. 5, however the transmission module may be included in the network device driver as one of component elements of the network device driver.

In a first case where data generated in the slave terminal 520 is about to be transmitted after the master terminal 510 is connected to the slave terminal 520 will be described in detail below.

After a transmission module of the master terminal 510 transmits a connection request message to the slave terminal 520, a transmission module of the slave terminal 520 responses with an acknowledge message, and the two transmission modules are connected with each other.

Under a condition that the two terminals are connected with each other, where hardware data or a hardware event occurs in the hardware of the slave terminal 520, the slave terminal 520 fetches/hooks the hardware data or hardware event, and packetizes the hardware data or hardware event. A driver data packet including the packetized hardware data or hardware event is transmitted from the slave terminal 520 to the master terminal 510 via the transmission modules which are connected with each other. The driver data packet is released in the network device driver, and is transmitted to an operating system of the master terminal 510.

In a second case of where data generated in the slave terminal 520 prior to the master terminal 510 is connected to the slave terminal 520 (*"will be described in detail below"?*).

As an example, a condition where the master terminal 510 is not connected to the slave terminal 520 is assumed. Where hardware data or a hardware event occurs in the hardware of the slave terminal 520, the slave terminal 520 fetches the hardware data or hooks the hardware event to generate a driver data packet, and tries to connect to the master terminal 510. The time where the slave terminal 520 tries to connect to the master terminal 510 corresponds to the time where the hardware data or hardware event occurs, or corresponds to the time where the driver data packet is generated, and the time period where the connection is attempted and the connection time between the two terminals 510 and 520 may be adjustable.

The slave terminal 520 transmits a connection request message via the transmission module of the slave terminal 520 in order to connect to the master terminal 510. Where the transmission module of the master terminal 510 transmits an acknowledge message in response to the connection request message, the two terminals 510 and 520 maintain the connection, and the slave terminal 520 transmits the driver data packet to the master terminal 510. The driver data packet is released in the network device driver, and is transmitted to the operating system of the master terminal 510.

Figure 6:
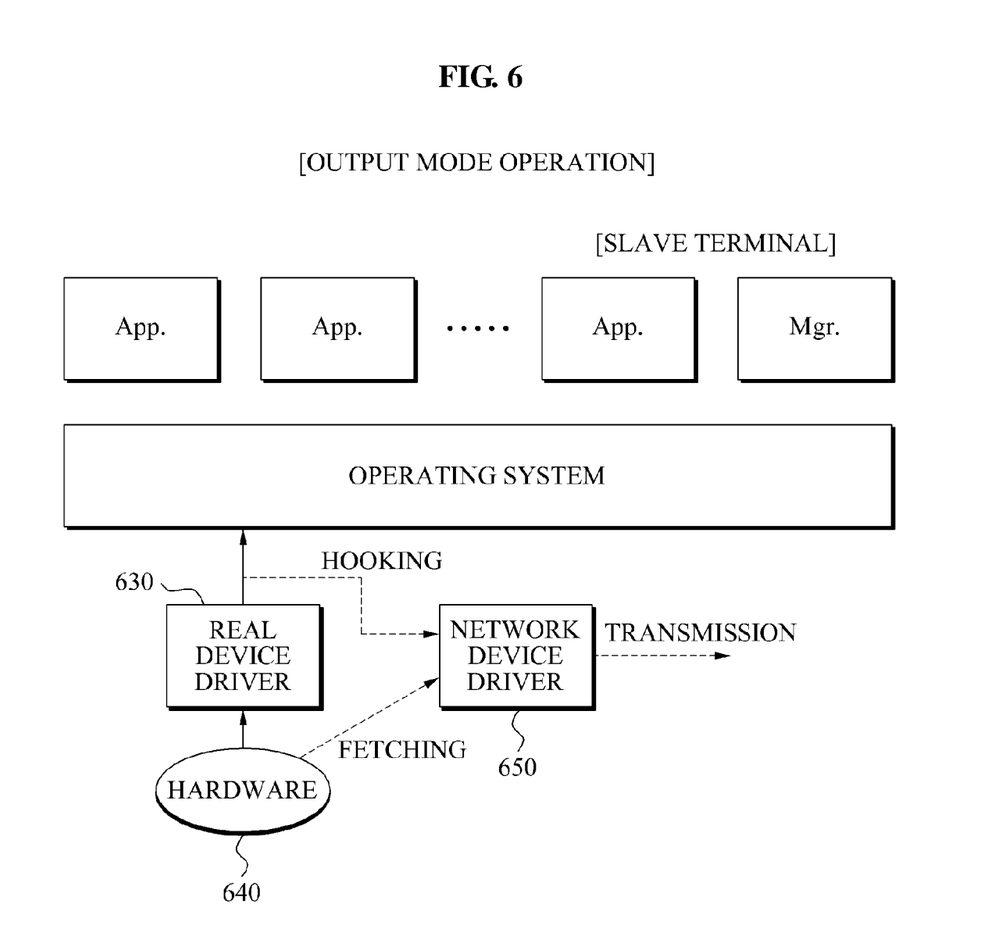
FIG. 6 illustrates an exemplary process where a network device driver operates according to an output mode.

FIG. 6 illustrates an exemplary process of an output mode operation of a network device driver. A terminal shown in FIG. 6 performs as a slave terminal, and a real device driver 630 of hardware 640, which is required to be utilized in a master terminal, is installed in the slave terminal.

The hardware 640 fetches information from a network device driver 650 where the information being generated in the hardware 640 is continuous information such as display information or mouse information, and the network device driver 650 operates to collect the information only where corresponding hardware operates where the information occurring the hardware 640 is information occurring due to an interrupt such as a keyboard input signal The network device driver 650 packetizes the collected information, and transmits the packetized information to a master terminal.

As described above, where the network device driver 650 operates only according to an output mode, a packet release module and a push module may be omitted from component elements of the network device driver 650.

Figure 7:
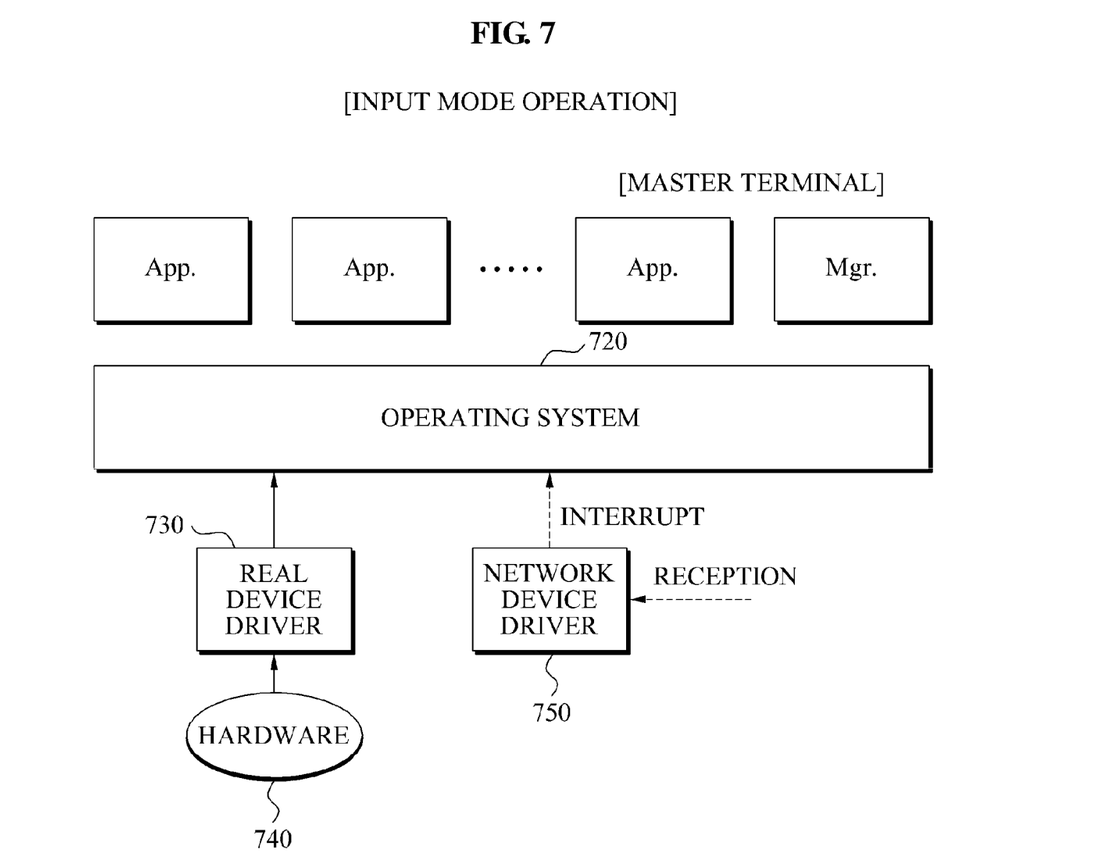
FIG. 7 illustrates an exemplary process that a network device driver operates according to an input mode.

FIG. 7 illustrates an exemplary process of an input mode operation of a network device driver. A terminal shown in FIG. 7 is a master terminal which is directly controlled by a user, and communicates with a slave terminal having a real device driver 730 of hardware 740 installed, the hardware 740 being required in the master terminal.

A network device driver 750 receives a driver data packet which is transmitted from the slave terminal, releases the driver data packet, and transmits the driver data packet to an operating system 720. The driver data packet is information that is outputted from hardware 740 and is packetized, and is received from an outside via a wired/wireless network, the hardware being required to be utilized in the master terminal.

As described above, where the network device driver 750 operates only according to the input mode, a fetch/hook module and a packet assembly module may be omitted from component elements of the network device driver 750.

Figure 8:
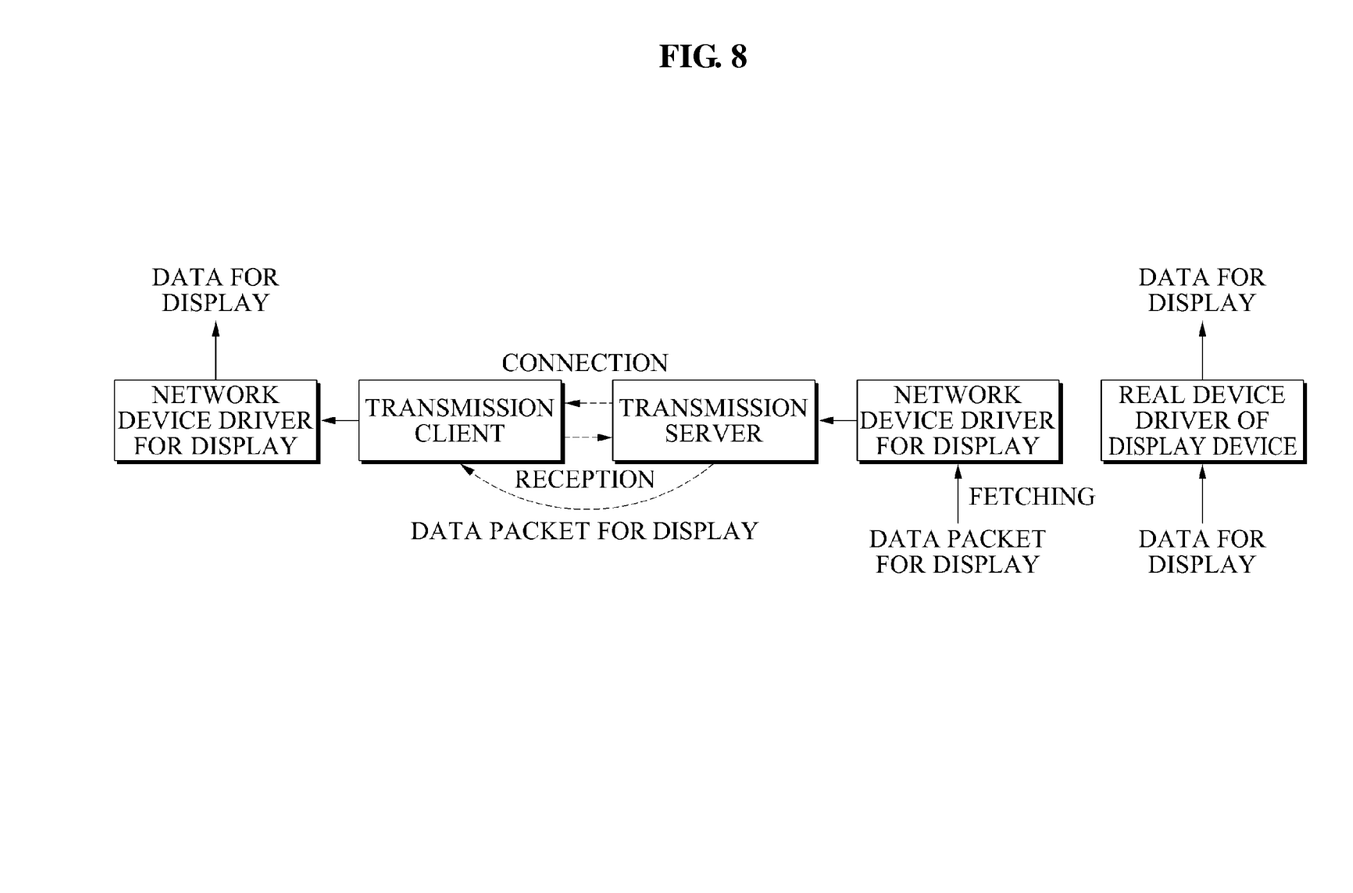
FIG. 8 illustrates an exemplary process of an operation where hardware is a display device.

FIG. 8 illustrates an exemplary process of an operation of a network device driver where hardware data is generated. Hardware required in a master terminal is a display device, and a real device driver of the display device is not installed in the master terminal, but is installed in a slave terminal. Where display data is generated in the display device, the network device driver of the slave terminal performs fetching with respect to the data for display and packet assembling. A data packet for a display generated through the packet assembling is transmitted from the slave terminal to the master terminal. In this instance, connection between transmission modes of the slave terminal and the master terminal may be initiated by a request from the master terminal prior to the generation of the data for the display, or initiated by a request from the slave terminal after the occurrence of the data for the display.

The network device driver of the master terminal which has received the data packet for the display releases the received data packet for the display, and transmits the data packet for the display to an operating system, thereby utilizing the display device without installing a real device driver of the display device in the master terminal.

Figure 9:
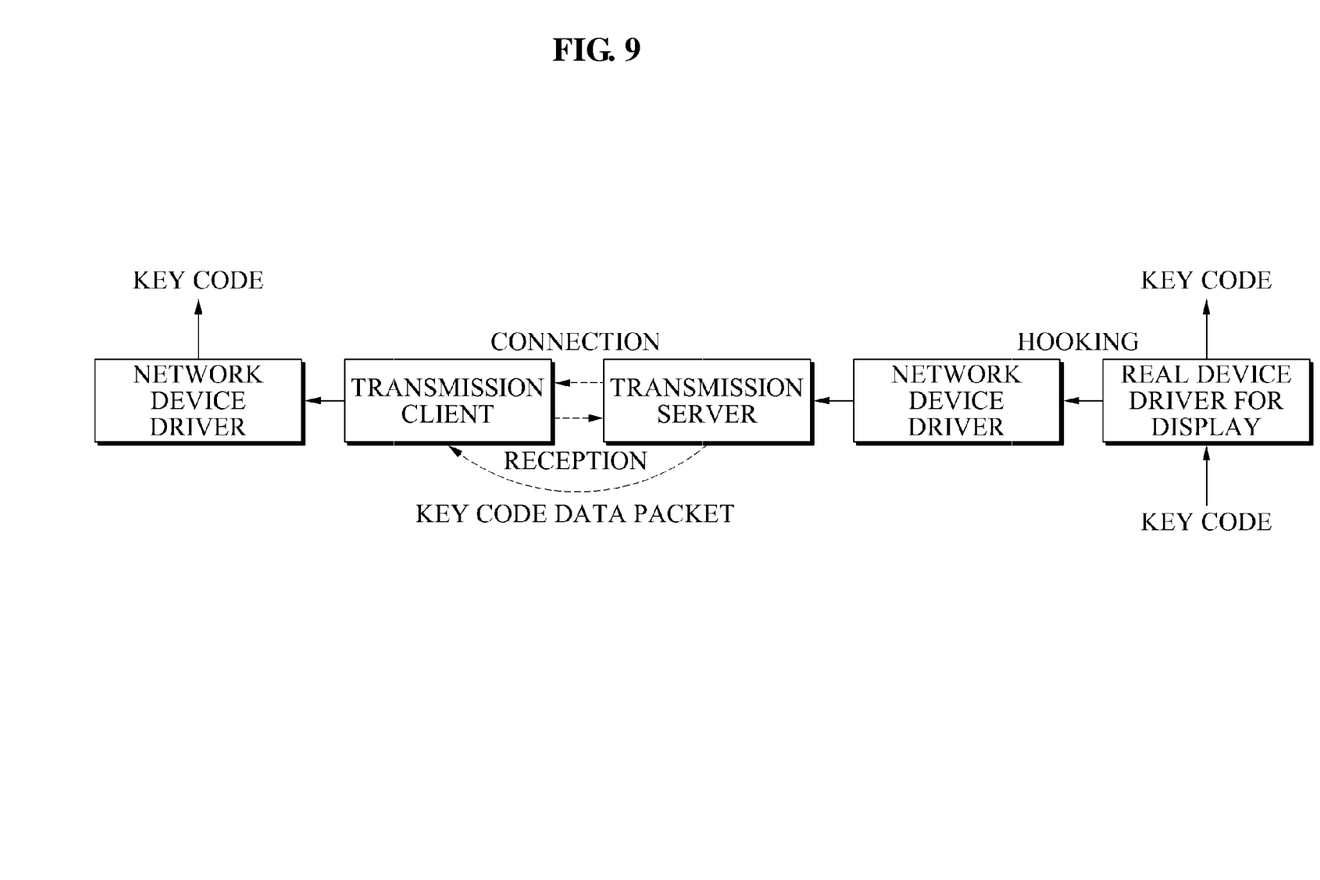
FIG. 9 illustrates an exemplary process of an operation where hardware is a keyboard.

FIG. 9 illustrates an exemplary process of an operation of a network device driver where a hardware event occurs. FIG. 9 illustrates the operation of the network device driver where a hardware is a keyboard, and the network device driver collects information about the hardware according to a method of hooking a signal of the keyboard since information occurring in the keyboard is not continuous information. Detailed description of FIG. 9 similar to FIG. 8 will be omitted for conciseness.

Accordingly, a function of corresponding hardware in a user terminal may be executed by selecting a portion of hardware installed in another device without installing an additional device driver.

A function of a peripheral device may be utilized via communication where a required function of a user is not installed in a user terminal and where the required function is in the peripheral device which is capable of communicating with the user terminal.

Moreover, a function of a user terminal may be expanded using a peripheral device, via communication, in various circumstances where the user terminal and the peripheral device exist.

The exemplary methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

Although a few exemplary embodiments have been shown and described, it will be understood that embodiments are not limited thereto and various modifications may be made. It would be appreciated by those skilled in the art that changes may be made to these exemplary embodiments without departing from the principles and spirit of the invention, the scope of which is defined by the claims and their equivalents.

What is claimed is:

1. A non-transitory computer-readable storage medium storing a network device driver interoperational with a real device driver installed in a communication terminal, the network device driver comprising:

a fetching/hooking module, which fetches/hooks at least one of hardware data and a hardware event of the communication terminal;

a packet assembly module, which packetizes the at least one of the hardware data and the hardware event;

a packet release module, which recovers at least one of the packetized hardware data and the hardware event, which are/is received from another communication terminal connected with the communication terminal via a wired/wireless communication network; and a transmission module, which receives/transmits the at least one of the packetized hardware data and the hardware event from/to the other communication terminal, wherein the communication terminal further comprises a manager module, which controls the network device driver to be transmitted to the other communication terminal according to a download request for the network device driver, the download request being transmitted from the other communication terminal, and wherein the fetching/hooking module
fetches the hardware data directly from a peripheral device of the communication terminal, and
hooks the hardware event directly from the real device driver of the communication terminal, the real device driver being an interface to operate the peripheral device.

2. The non-transitory computer-readable storage medium of claim 1, wherein the network device driver further comprises:
a skeleton module, which enables an operating system of the communication terminal to identify the network device driver as a real device driver.

3. The non-transitory computer-readable storage medium of claim 1, wherein the manager module requests the other communication terminal to transmit the network device driver where the network device driver is not installed in the communication terminal.

4. The non-transitory computer-readable storage medium of claim 1, wherein the network device driver further comprises:
a push module, which transmits, to an operating system of the communication terminal, the at least one of the hardware data and the hardware event, which is recovered in the packet release module.

5. A method of operating a network device driver installed in a communication terminal, the method comprising:
fetching/hooking hardware data and/or a hardware event of the communication terminal, the hardware data being continuous information generated from a peripheral device of the communication terminal, and the hardware event being volatile information generated from the peripheral device;
packetizing the hardware data and/or the hardware event;
attempting to establish a connection with another terminal, which is connected with the communication terminal via a wired and/or wireless communication network; and
transmitting the packetized hardware data and/or the packetized hardware event to the other terminal in response to the connection being established between the communication terminal and the other terminal,
wherein the fetching/hooking of the hardware data and/or the hardware event comprises
fetching the hardware data directly from the peripheral device, and
hooking the hardware event directly from a real device driver of the communication terminal, the real device driver being an interface to operate the peripheral device.

6. The method of operating the network device driver of claim 5, wherein a frequency between attempts to establish a the connection between the communication terminal and the other terminal is adjustable.

7. The method of operating the network device driver of claim 5, wherein a connection time for which the communication terminal and the other terminal are connected is adjustable.

8. A method of operating a network device driver installed in a communication terminal, the method comprising:
receiving packetized hardware data and/or a packetized hardware event from another communication terminal, the hardware data being continuous information generated from a peripheral device of the other communication terminal, and the hardware event being volatile information generated from the peripheral device;
releasing the packetized hardware data and/or the packetized hardware event; and
transmitting the released hardware data and/or the released hardware event to an operating system of the communication terminal,
wherein the hardware data is fetched, by another network device driver of the other communication terminal, directly from the peripheral device, the other network device driver communicating with the communication terminal, and
wherein the hardware event is hooked, by the other network device driver, directly from a real device driver of the other communication terminal, the real device driver being an interface to operate the peripheral device.

9. A method of connecting a master terminal with a slave terminal, the method comprising:
transmitting a request signal for a network device driver list to the slave terminal;
receiving a response signal from the slave terminal;
analyzing the response signal, and determining whether a connection target network device driver of the slave terminal exists;
connecting a network device driver of the master terminal with the connection target network device driver in response to the connection target network device driver being determined to exist; and
installing the connection target network device driver according to a response signal comprising the connection target network device driver that is received from the slave terminal,
wherein the connection target network device driver of the slave terminal
fetches hardware data of the slave terminal directly from a peripheral device of the slave terminal, the hardware data being continuous information generated from the peripheral device,
hooks a hardware event of the slave terminal directly from a real device driver of the slave terminal, the real device driver being an interface to operate the peripheral device, the hardware event being volatile information generated from the peripheral device, and
transmits the hardware data and/or the hardware event to the master terminal.

10. The method of connecting the master terminal with the slave terminal of claim 9, further comprising:
transmitting, to the slave terminal, a request signal to download the connection target network device driver in response to the connection target network device driver being determined to not exist.

11. The method of connecting the master terminal with the slave terminal of claim 9, further comprising:
transmitting, to the slave terminal, a request signal to release the connection of the master terminal with the slave terminal; and
releasing the connection of the master terminal with the slave terminal.

* * * * *